United States Patent [19]

Mikawa

[11] Patent Number: 5,784,984
[45] Date of Patent: Jul. 28, 1998

[54] SEEDLING TRANSPORTATION APPARATUS FOR TRANSPLANTATION MACHINE

[75] Inventor: Isao Mikawa, Hokkaido, Japan

[73] Assignee: Circle Tekko Co., Ltd., Hokkaido, Japan

[21] Appl. No.: 818,546

[22] Filed: Mar. 14, 1997

[30] Foreign Application Priority Data

May 10, 1996 [JP] Japan .................. 8-139783

[51] Int. Cl.⁶ .................................................. A01C 11/00
[52] U.S. Cl. ............................. 111/105; 47/901; 414/417
[58] Field of Search ........................... 111/105, 104, 111/101, 106, 200; 414/404, 406, 408, 416, 417, 502, 518; 47/901, 1.01 R

[56] References Cited

U.S. PATENT DOCUMENTS

| | | | |
|---|---|---|---|
| 4,440,101 | 4/1984 | Edwards et al. | 111/105 |
| 4,644,880 | 2/1987 | Branch | 111/105 |
| 4,750,439 | 6/1988 | Degroot | 111/105 |
| 4,893,571 | 1/1990 | Hakli et al. | 111/105 |
| 5,477,791 | 12/1995 | Nakashima et al. | 111/105 |
| 5,557,881 | 9/1996 | Bouldin et al. | 47/901 X |

FOREIGN PATENT DOCUMENTS

| | | | |
|---|---|---|---|
| 7-184419 | 7/1995 | Japan | A01C 11/02 |
| 7-184421 | 7/1995 | Japan | A01C 11/02 |
| 2166634 | 5/1986 | United Kingdom | 111/105 |

*Primary Examiner*—Terry Lee Melius
*Assistant Examiner*—Victor Batson
*Attorney, Agent, or Firm*—Sughrue, Mion, Zinn, Macpeak & Seas, PLLC

[57] ABSTRACT

The invention provides a seedling transportation apparatus of a simple structure wherein a new seedling tray can be supplied readily without immediately removing an emptied old seedling tray and does not interfere, when it is moved toward the downstream side in a transportation direction, with a transportation operation for a seedling. To this end, transportation of a seedling tray is performed not in an upright condition or in a curved or bent condition but in a horizontal condition. The seedling transportation apparatus for a transplantation machine includes a seedling taking out apparatus for taking out a seedling upwardly from a seedling tray having seeding accommodating cells in which seedlings are accommodated, a tray transportation apparatus having a horizontal transport path for transporting the seedling tray toward the seedling taking out apparatus, a seedling carrying out conveyor disposed at a location higher than the horizontal transport path of the tray transportation apparatus, and a transferring apparatus for transferring the seedling taken out by the seedling taking out apparatus onto the seedling carrying out conveyor.

4 Claims, 14 Drawing Sheets

SEEDLING TRANSPORTATION APPARATUS FOR TRANSPLANTATION MACHINE

BACKGROUND OF THE INVENTION

1. Field of the Invention

This invention relates to a seedling transportation apparatus for a transplantation machine wherein a seedling taken out from a seedling tray transported horizontally is transported by a seedling carrying out conveyor disposed on the downstream side of the seedling tray in a transportation direction.

2. Description of the Related Art

Various seedling transportation apparatus of the type mentioned are known, and an exemplary one of such seedling transportation apparatus is shown in FIG. 14.

Referring to FIG. 14, the seedling transportation apparatus shown uses a seedling tray 3 wherein a tray body 1 formed from a foamed resin material or the like and having a generally plate like profile has a large number of seedling accommodating cells 2 formed therein such that each of them has a diameter which gradually decreases from an opening $2a$ to a bottom portion $2b$ thereof. The seedling transportation apparatus holds the seedling tray 3 uprightly such that the seedling accommodating cells 2 may extend horizontally as seen in FIG. 14. In this condition, the seedling tray 3 is successively fed downwardly with a fixed pitch while seedlings P in the seedling accommodating cells 2 of the tray body 1 are successively taken out by a seedling taking out needle 4. The seedlings P taken out are successively transferred to a seedling carrying out conveyor 5 located sidewardly of the seedling tray 3.

In the seedling transportation apparatus, seedlings P must be taken out from the seedling tray 3 while the seedling tray 3 is kept uprightly. Further, in order to allow a new seedling tray 3' to be supplied, the seedling tray 3 from which all of the seedlings P have been taken out must be removed immediately.

Another seedling transportation apparatus is constructed such that a seedling tray is transported along an inclined path, and at a predetermined position during the transportation, a seedling is taken out from the seedling tray. Then, the seedling tray from which seedlings are successively taken out is transported in a discharging direction while it is curved or bent gradually.

In the seedling transportation apparatus just described, since a seedling tray from which seedlings are taken out so that it is emptied is curved or bent along a predetermined path so that it may not interfere with a next seedling to be taken out, the transportation mechanism for a seedling tray is complicated.

SUMMARY OF THE INVENTION

It is an object of the present invention to provide a seedling transportation apparatus wherein, also where a seedling tray having a generally plate-like profile is used, a new seedling tray can be supplied readily without immediately removing an old seedling tray which has been emptied as seedlings have been taken out from it.

It is another object of the present invention to provide a seedling transportation apparatus of a simple structure wherein a seedling tray which is moved toward the downstream side in a transportation direction does not interfere with a transportation operation for a seedling.

In order to attain the objects described above, according to the present invention, there is provided a seedling transportation apparatus for a transplantation machine, comprising a seedling taking out apparatus for taking out a seedling upwardly from a seedling tray having seeding accommodating cells in which seedlings are accommodated, a tray transportation apparatus having a horizontal transport path for transporting the seedling tray toward the seedling taking out apparatus, a seedling carrying out conveyor disposed at a location higher than the horizontal transport path of the tray transportation apparatus, and a transferring apparatus for transferring the seedling taken out by the seedling taking out apparatus onto the seedling carrying out conveyor.

In the seedling transportation apparatus for a transplantation machine, the tray transportation apparatus horizontally transports a seedling tray along the horizontal transport path thereof, and the seedling taking out apparatus takes out a seedling upwardly from the seedling tray which is in a horizontal condition. Then, the transferring apparatus transfers the seedling taken out by the seedling taking out apparatus onto the seedling carrying out conveyor disposed at a location higher than the horizontal transport path of the tray transportation apparatus.

Accordingly, such operations that are performed by a conventional seedling transportation apparatus as to transport a seedling tray in an upright condition or along a bent or curved path or to take out a seedling from a seedling tray being transported need not be performed, and a series of operations necessary for transportation of seedlings can be performed accurately by a comparatively simple construction.

Further, different from a conventional seedling transportation apparatus, the seedling transportation apparatus of the present invention can transport a seedling tray, which has become emptied, to the downstream side as it is without removing it immediately to the outside of the transport path. Consequently, handling of a seedling tray from which seedlings have been removed to put the seedling tray into an empty condition is facilitated.

The seedling taking out apparatus may include a seedling pushing out mechanism for pushing out a seedling upwardly from the seedling tray and a seedling holding mechanism for holding the seedling pushed out by the seedling pushing out mechanism.

The transferring apparatus may move the seedling holding mechanism back and forth between a seedling penetrating position at which the seedling holding mechanism receives a seedling in a cell of the seedling tray and a seedling releasing position at which the seedling holding mechanism releases the received seedling toward the seedling carrying out conveyor.

The seedling transportation apparatus for a transplantation machine may further comprise means defining a tray space formed on the downstream side of the tray transportation apparatus below the seedling carrying out conveyor.

Where the tray space is formed in this manner, seedling trays which have become emptied can be placed temporarily one on another in the tray space, and handling of seedling trays is further facilitated.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
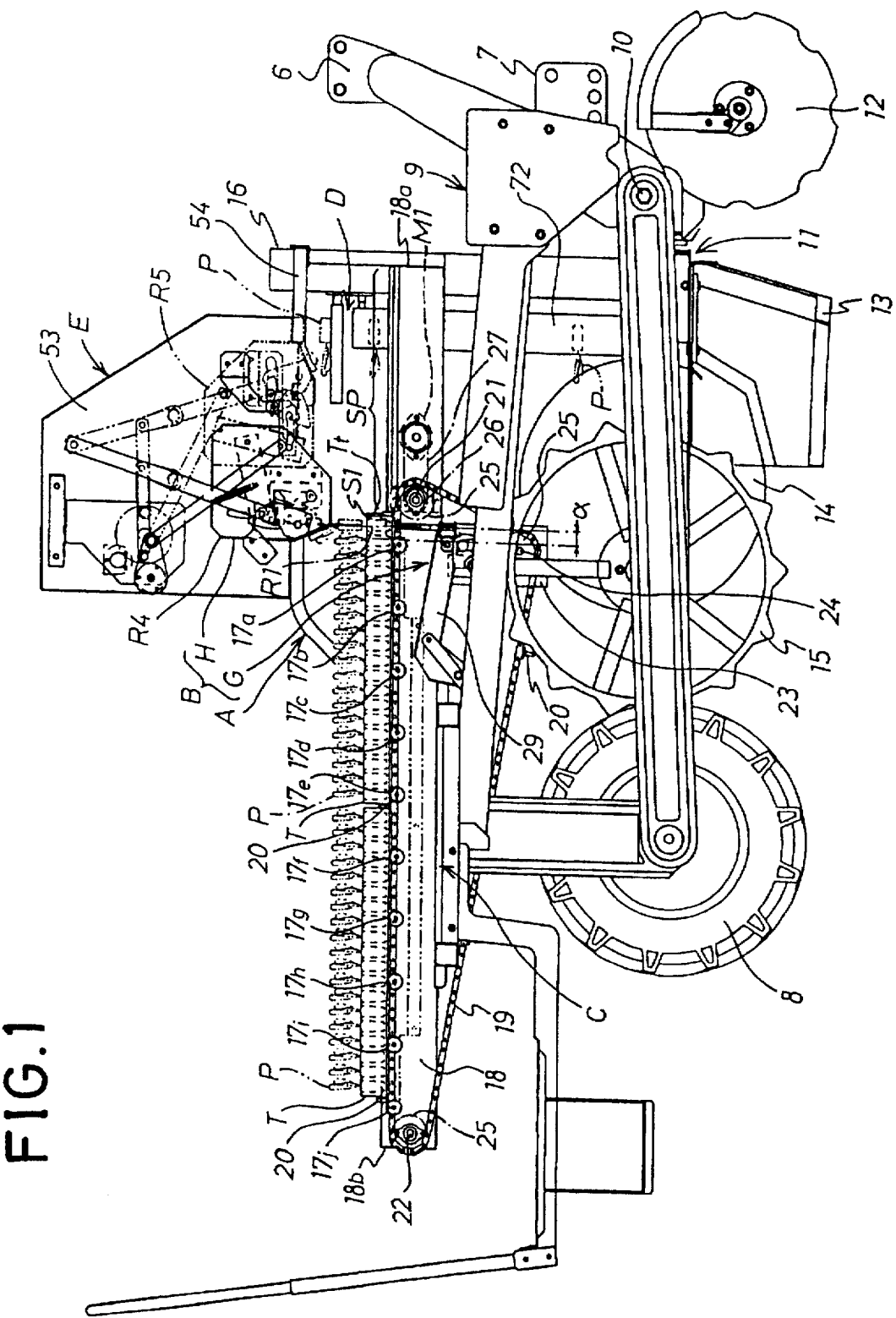
FIG. 1 is a side elevational view of a seedling transplantation machine on which a seedling transportation apparatus to which the present invention is applied is carried.
Figure 2:
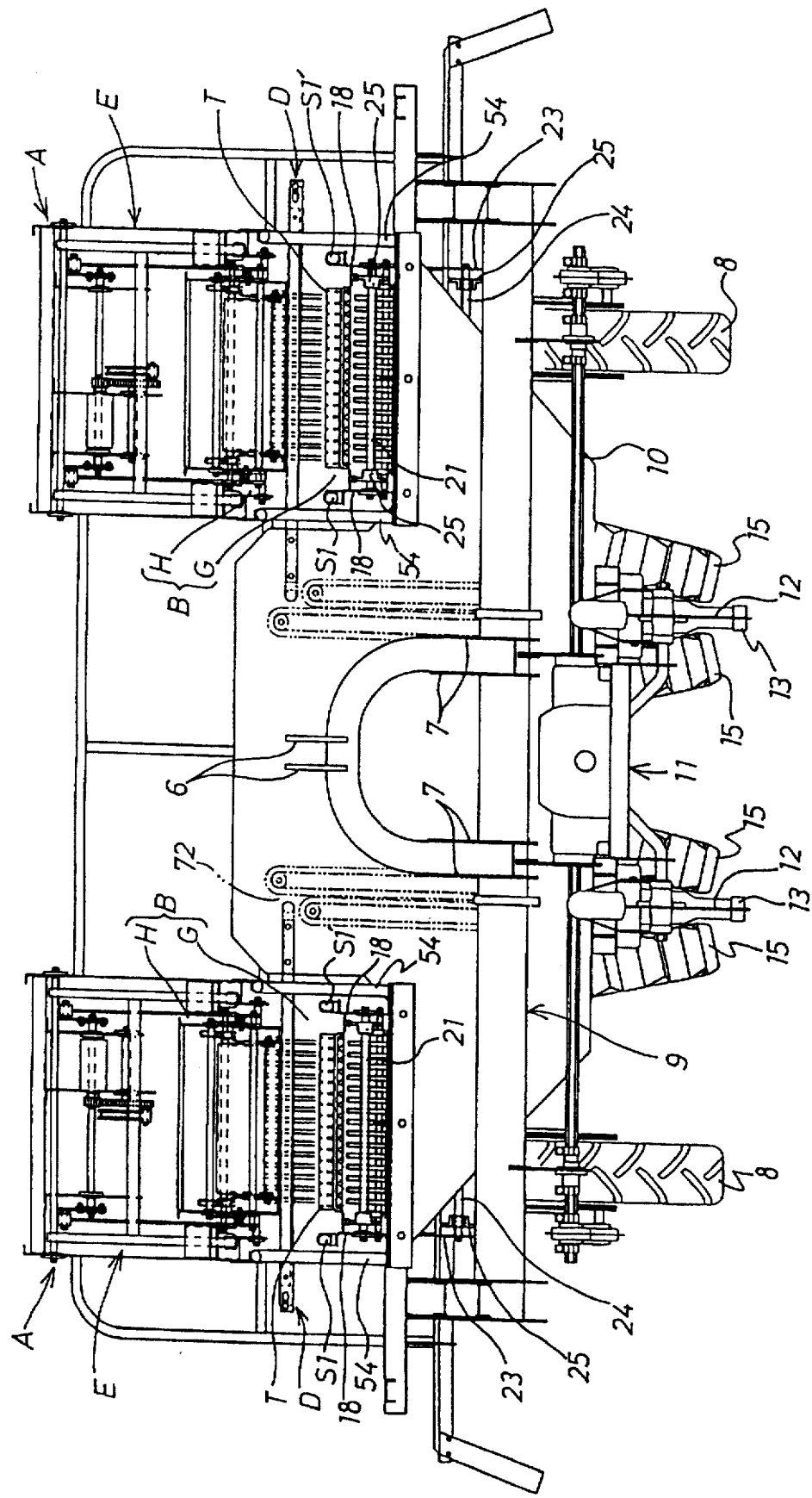
FIG. 2 is a front elevational view of the seedling transplantation machine of FIG. 1.

Referring first to FIGS. 1 and 2, there is shown a seedling transplantation machine on which a seedling transportation apparatus to which the present invention is applied is carried.

The seedling transplantation machine shown includes a main frame 9 having pairs of upper and lower connection members 6 and 7 for connection to a tractor (not shown) formed on the front side thereof such that they project forwardly as seen in FIG. 2 and having a pair of driving wheels 8 provided on the rear side thereof, and a movable frame 11 mounted for upward and downward pivotal motion around a shaft 10 mounted horizontally at a front portion of the main frame 9. Successively located from the front side to the rear side on the movable frame 11 are a pair of rolling coulters 12 for cutting disturbing substances, a pair of openers 13 for forming furrows, a pair of seedling planting wheels 14 (only one is shown in FIG. 1) for planting seedlings P into the furrows formed by the openers 13, and two sets of pressing down wheels 15 for pressing down the seedlings P planted by the seedling planting wheels 14. Further, a pair of left and right seedling transportation apparatus A for supplying seedlings P to the seedling planting wheels 14, to which the present invention is applied, are carried on the movable frame 11.

Each of the seedling transportation apparatus A includes a seedling taking out apparatus B for taking out seedlings P upwardly from a seedling tray T, a tray transportation apparatus C for transporting the seedling tray T horizontally toward the seedling taking out apparatus B, and a transferring apparatus E for transferring the seedlings P taken out by the seedling taking out apparatus B to a seedling carrying out conveyor D. The seedling taking out apparatus B, tray transportation apparatus C and transferring apparatus E are carried in an integrated relationship on a machine frame 16 mounted uprightly at a front portion of the movable frame 11.

Figure 7:
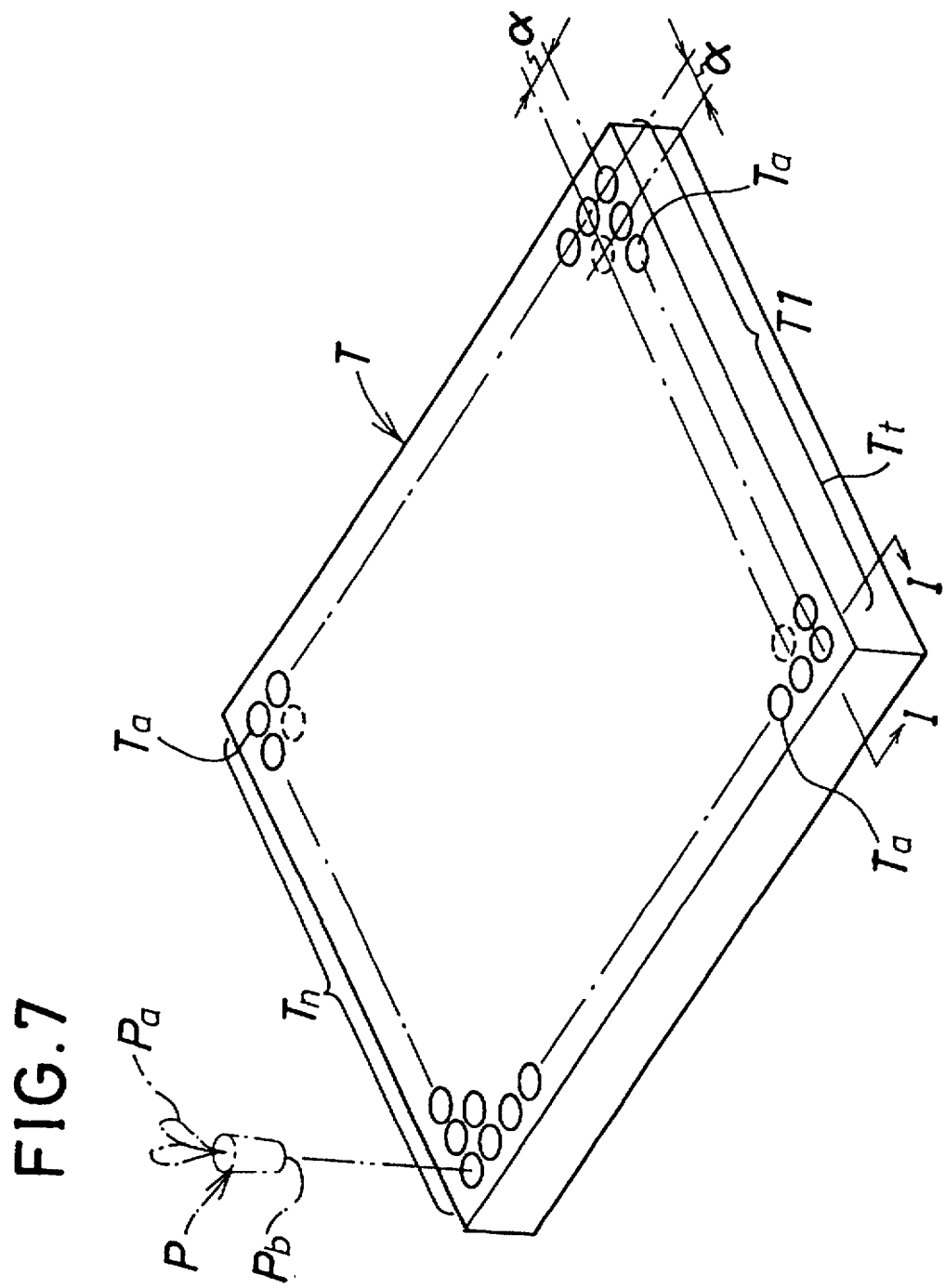
FIG. 7 is a schematic perspective view of a seedling tray to be used with the seedling transplantation machine of FIG. 1.
Figure 8:
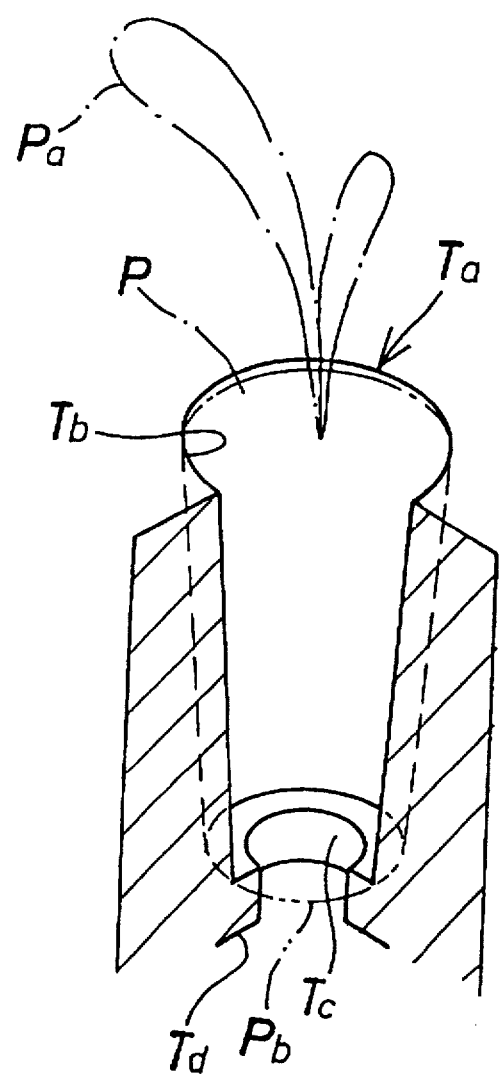
FIG. 8 is a partial enlarged sectional view taken along line I—I of FIG. 7.

Referring to FIGS. 7 and 8, the seedling tray T is generally in the form of a plate made of foamed styrene which cannot be bent during transportation, and has a plurality of seedling accommodating cells (hereinafter referred to simply as cells) Ta formed in a concave condition in a matrix having a pitch a equal in the perpendicular directions on a plane of the seedling tray T. Each of the cells Ta is formed such that the diameter thereof gradually decreases from an upper opening Tb to a bottom portion Td of the cell Ta, and has a rod insertion hole Tc formed in the bottom portion Td thereof.

Referring back to FIGS. 1 and 2, such seedling trays T are placed horizontally on the tray transportation apparatus C in an upright posture in which leaves Pa of seedlings P accommodated in the cells Ta thereof extend upwardly.

Referring to FIGS. 1 to 6, the tray transportation apparatus C includes tray receiving rollers 17a to 17j arranged horizontally for individual rotation at predetermined distances such that two seedling trays T may be placed along upper edges of a pair of left and right base plates 18 between a location adjacent front ends 18a and another location adjacent rear ends 18b of the left and right base plates 18.

A plurality of tray moving bars 20 for a moving seedling tray T are mounted horizontally in a predetermined spaced relationship from each other on a pair of left and right roller chains 19. The roller chains 19 extend along the tray receiving rollers 17a to 17j, and to this end, a pair of chain stretching shafts 21 and 22 are provided in parallel to each other on the front side with respect to the tray receiving roller 17a and the rear side with respect to the tray receiving roller 17j, respectively. A further chain stretching shaft 24 is mounted between a pair of left and right leg plates 23 of the left and right base plates 18 which extend downwardly below the tray receiving roller 17a as seen in FIGS. 3 to 6.

Pairs of sprocket wheels 25 for keeping the roller chains 19 taut are secured at the opposite end portions of the chain stretching shafts 21, 22 and 24. A motor M1 is connected to the chain stretching shaft 21 via a roller chain 27 which extends between the motor M1 and a sprocket wheel 26 secured to an intermediate portion of the chain stretching shaft 21.

When the motor M1 is energized, the roller chains 19 are driven to move a seedling tray T toward the seedling taking out apparatus B. Consequently, the seedling tray T is pushed by one of the tray moving bars 20 so that it is moved toward a seedling taking out position R1 at which seedlings P are taken out from the seedling tray T by the seedling taking out apparatus B.

A tray space SP is formed along the upper edges of the left and right base plates 18 adjacent the front ends 18a, that is, along a transport path of a seedling tray T below the seedling carrying out conveyor D, so that a seedling tray T may temporarily stay there. Thus, a seedling tray T after it is emptied as seedlings P are taken out therefrom at the seedling taking out position R1 is moved to the tray space SP.

Figure 4:
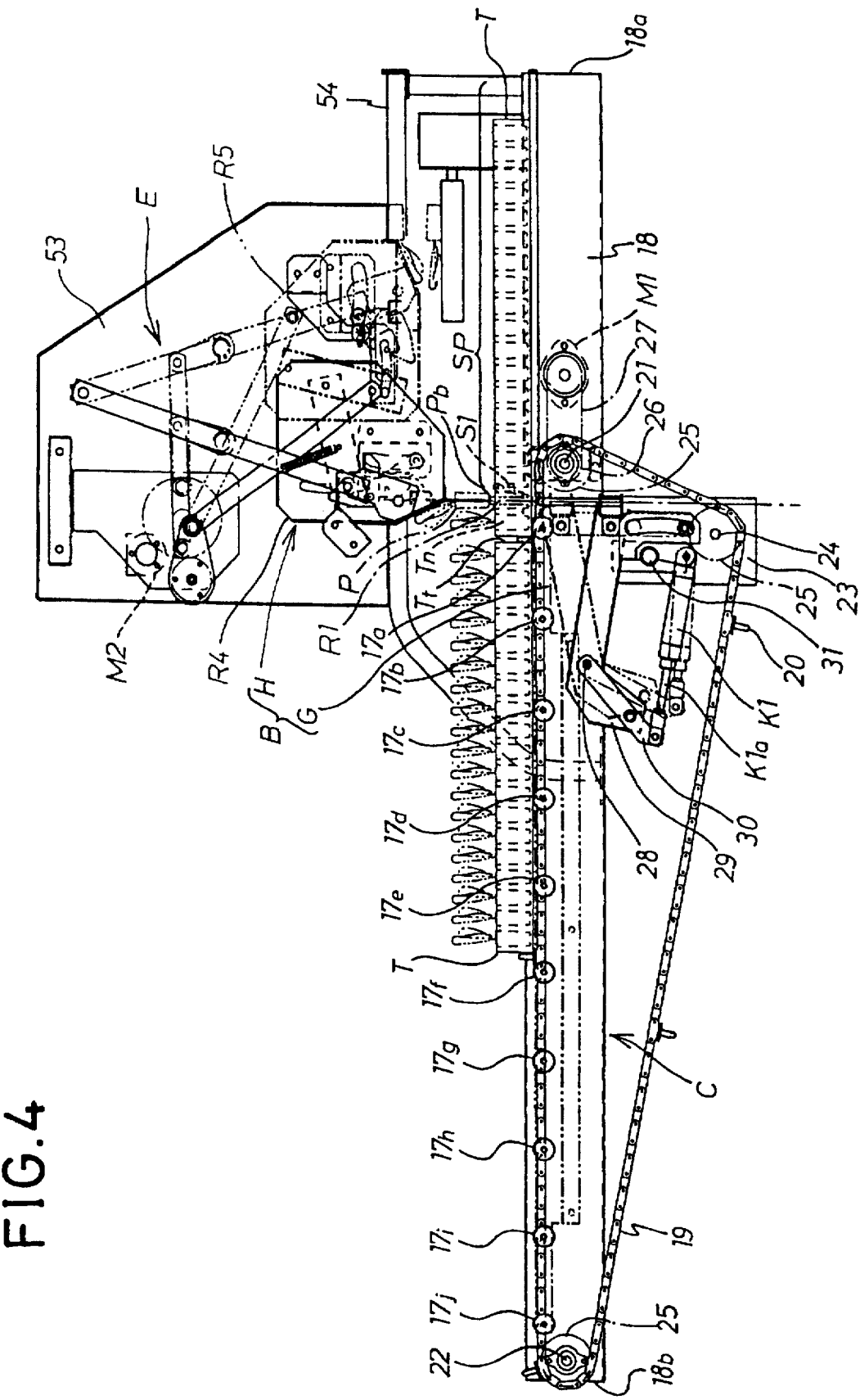
FIG. 4 is a similar view but showing the seedling transportation apparatus in another condition wherein a trailing cell row of a preceding one of two successive seedling trays placed on a tray transportation apparatus shown in FIG. 1 stops at the seedling taking out position.

In particular, a seedling tray T moved by one of the tray moving bars 20 is moved toward the tray space SP while seedlings P are successively taken out therefrom at the seedling taking out position R1 such that, after those seedlings P accommodated in the last cell row Tn of the seedling tray T are taken out from the seedling tray T, the thus emptied seedling tray T stays in the tray space SP (refer to FIGS. 4 and 7).

Figure 9:
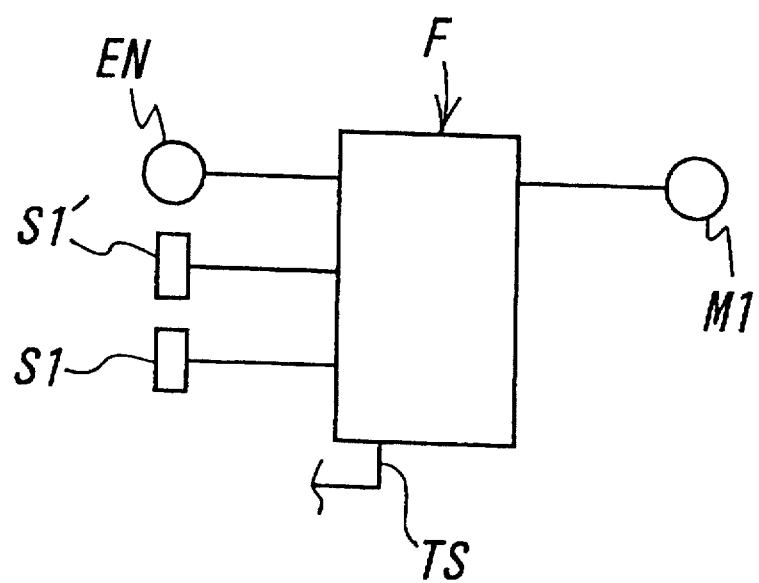
FIG. 9 is a block diagram showing an electric circuit of a driving control section of the seedling transplantation apparatus of FIG. 1.

Driving of the tray transportation apparatus C is controlled by a driving control section F formed from a sequencer or the like. A rotary encoder EN (FIG. 6) connected to an end of the chain stretching shaft 21, a pair of tray detecting sensors S1 and S1' (FIGS. 5 and 6) provided at upper edge portions of the left and right base plates 18 on the rear side with respect to the chain stretching shaft 21 and a timing signal line TS from the seedling taking out apparatus B are connected to the input side of the driving control section F while the motor M1 is connected to the output side of the driving control section F (FIG. 9).

Figure 3:
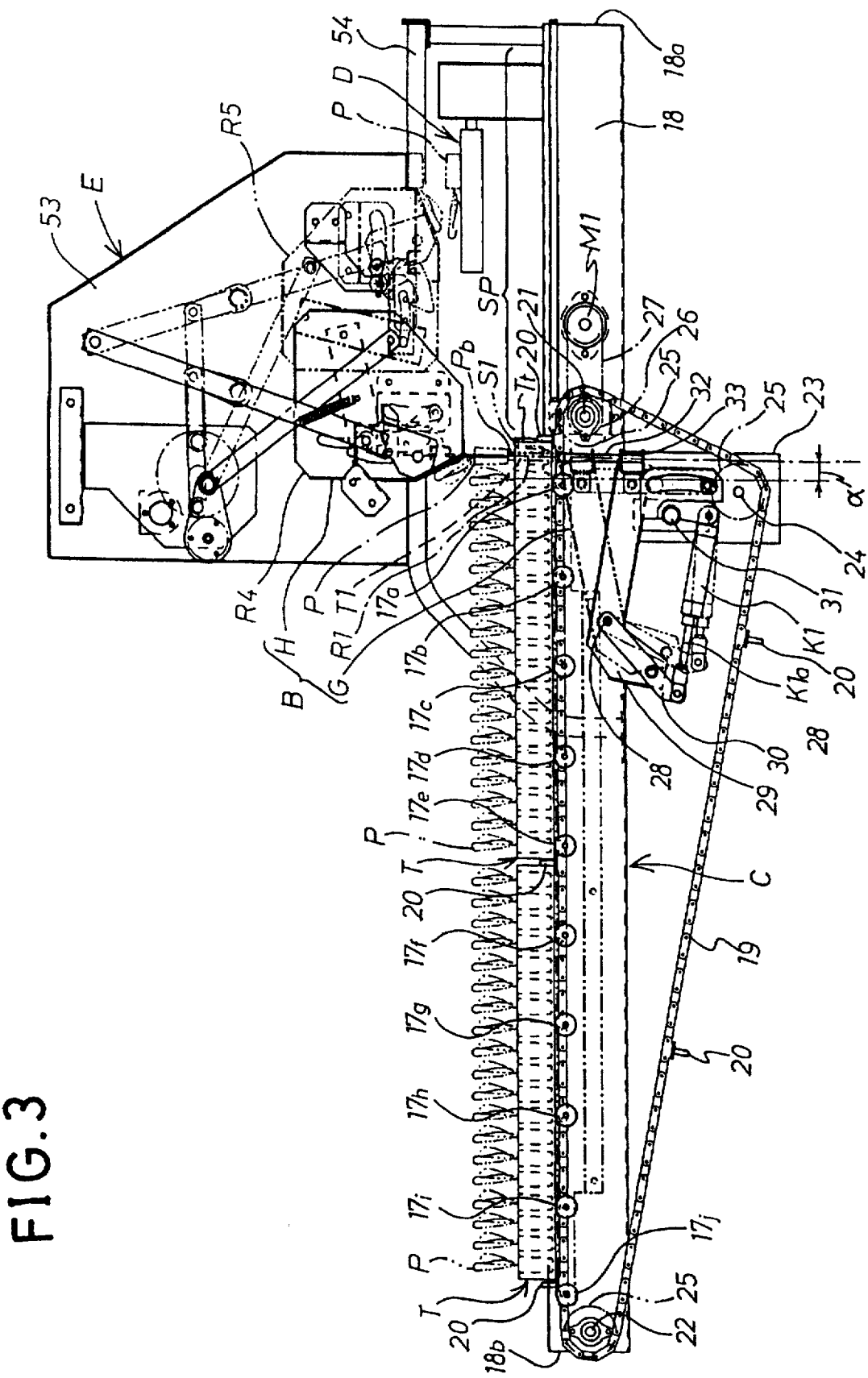
FIG. 3 is a side elevational view showing the seedling transportation apparatus shown in FIG. 1 in a condition wherein the first or leading cell row of a seedling tray stops at a seedling taking out position.

The driving control section F has the following functions:
(1) to stop, when a leading end face Tt of a seedling tray T is detected by means of the tray detecting sensors S1 and S1', energization of the motor M1 to stop movement of the seedling tray T to stop the first cell row T1 of the seedling tray T at the seedling taking out position R1 (FIG. 3);
(2) to calculate the distance of movement of the seedling tray T based on the angle of rotation of the chain stretching shaft 21 detected by the rotary encoder EN; and
(3) to discriminate whether or not the calculated distance of movement coincides with the pitch a of the cells Ta formed on the seedling tray T and stop energization of the motor M1 when it coincides with the pitch α. Consequently, the following cell rows are successively stopped at the seedling taking out position R1.

When the leading end face Tt of a seedling tray T placed on the tray receiving rollers 17a to 17j is detected by the tray detecting sensors S1 and S1', the first cell row T1 of the seedling tray T stops at the seedling taking out position R1. Then, while the first cell row T1 stops there, a taking out operation of seedlings P by the seedling taking out apparatus B is performed.

Then, when an end signal of the taking out operation is outputted from the seedling taking out apparatus B, the driving control section F re-starts energization of the motor M1 to transport the seedling tray T again. Then, when the transport distance of the seedling tray T becomes coincident with the pitch α between the cells Ta formed on the seedling tray T again, the driving control section F stops energization of the motor M1 again so that the next cell row may be stopped at the seedling taking out position R1. The following cell rows are successively stopped at the seedling taking out position R1 in this manner.

Referring to FIGS. 3, 4, 10 and 11, the seedling taking out apparatus B includes a seedling holding mechanism H which position seedling holding needles 42, which will be hereinafter described, serving as seedling holding elements in the proximity of the upper openings Tb of those cells Ta stopping at the seedling taking out position R1 for penetrating seedlings P pushed out from the cells Ta, and a seedling pushing out mechanism G for pushing out the seedlings P to be pushed out from the cells Ta until trailing ends Pb of the seedlings P move to the outside of the upper openings Tb.

The seedling pushing out mechanism G includes a pair of pushing up arms 29 secured at base end portions thereof to a shaft 28 which is supported for rotation on and extends between the left and right base plates 18. A bracket 30 is secured to an intermediate portion of the shaft 28, and a driving rod K1a of a hydraulic or pneumatic fluid pressure cylinder K1 is connected to the bracket 30. The fluid pressure cylinder K1 is mounted by means of a bracket 31a on a connection pipe 31 extending horizontally between the left and right leg plates 23.

Figure 10:
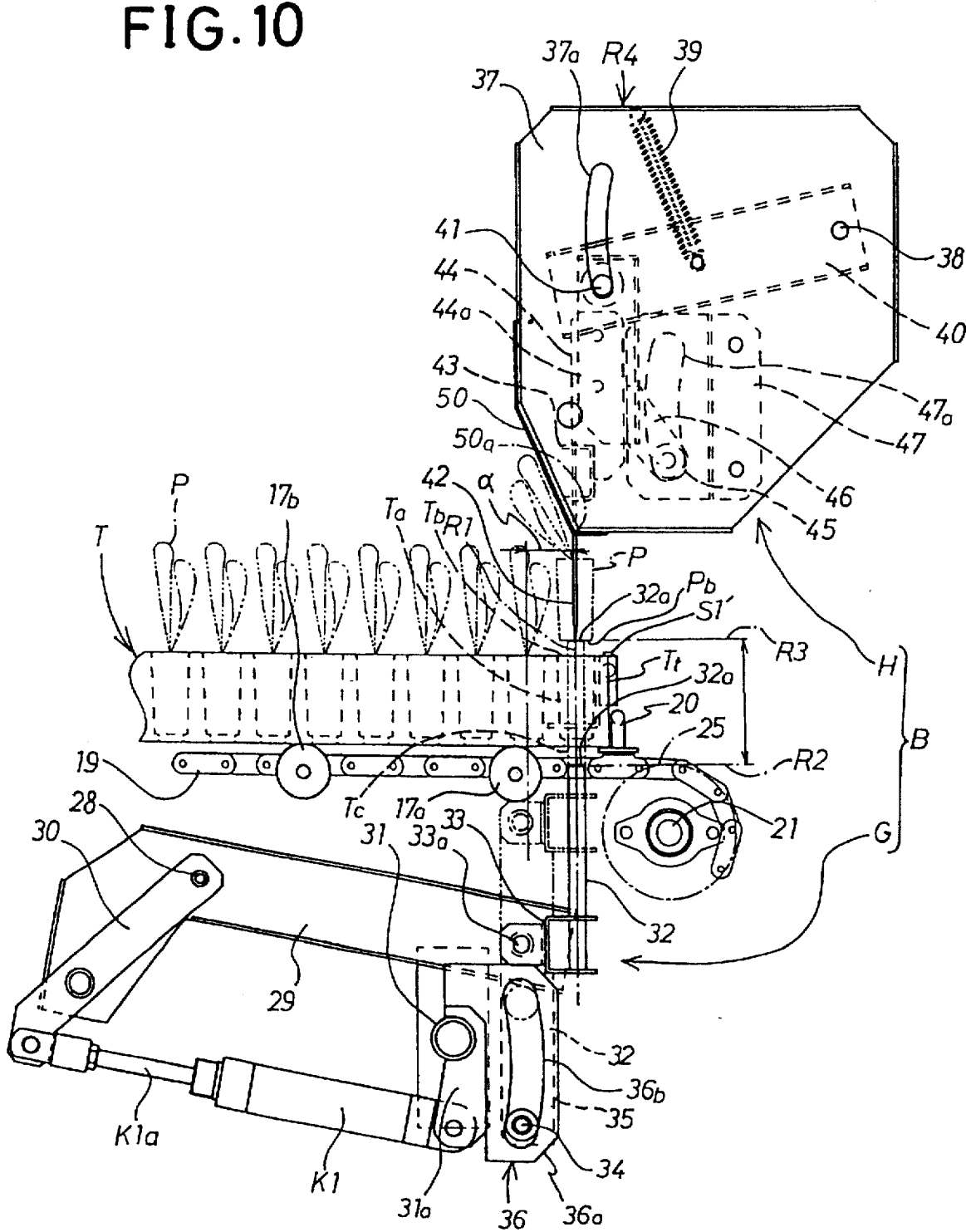
FIG. 10 is an enlarged side elevational view of the seedling transportation apparatus of FIG. 5 particularly showing a seedling taking out apparatus and associated elements when the leading cell row of a seedling tray stops at the seedling taking out position.
Figure 11:
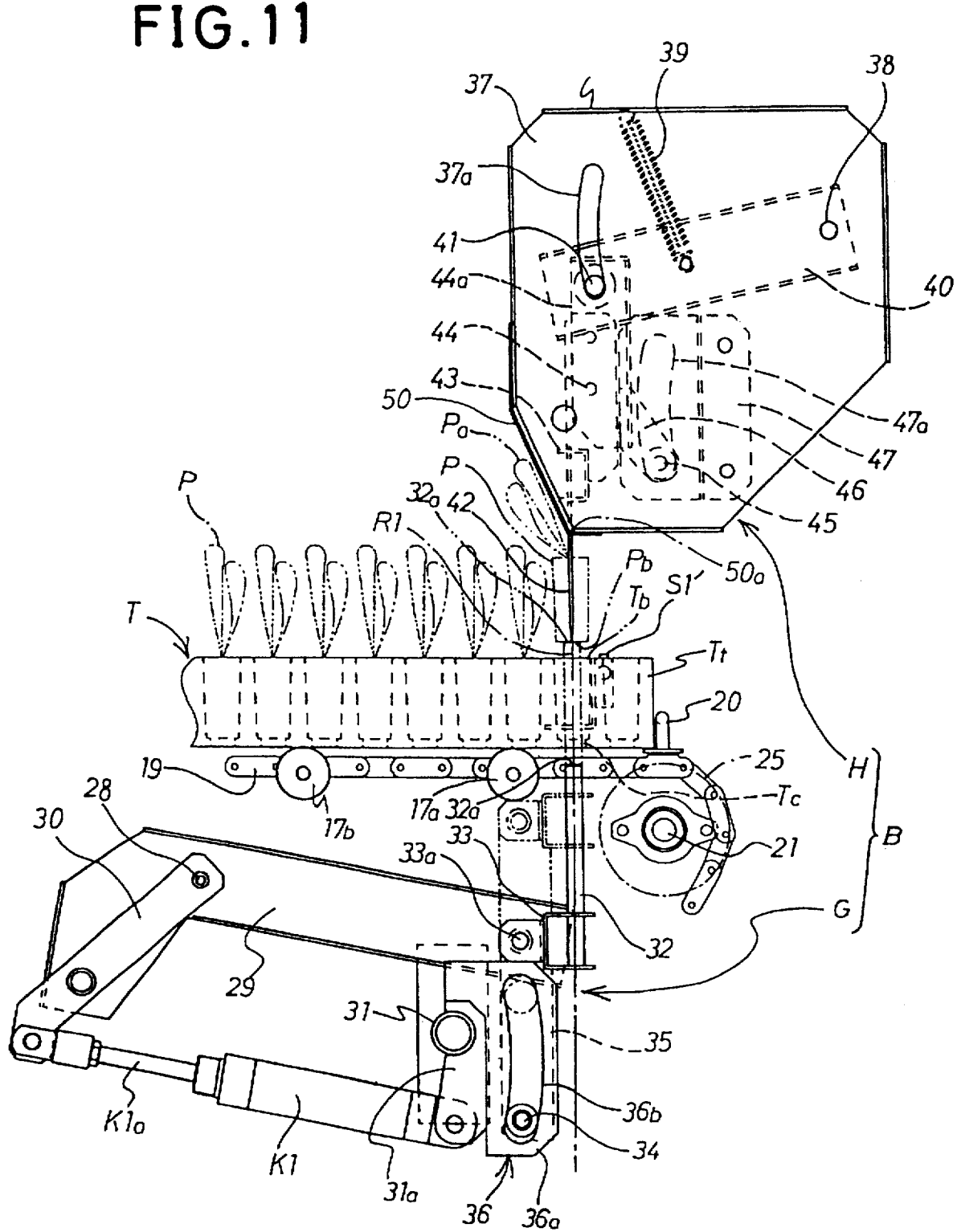
FIG. 11 is a similar view but showing the seedling taking out apparatus when the second cell row of the seedling tray stops at the seedling taking out position.

Referring to FIGS. 10 and 11, a rod supporting member 33 having a plurality of seedling pushing out rods 32 formed uprightly thereon extends horizontally between end portions of the pushing up arms 29. The rod supporting member 33 has a pair of downwardly extending vertically elongated guide elements 35 formed on a lower face thereof, and a guide roller 34 is mounted for rotation at a lower end portion of each of the vertically elongated guide elements 35.

A guide plate 36 having a pair of left and right bent lugs 36a is secured to the connection pipe 31, and a pair of arcuate guideways 36b for guiding the guide roller 34 are formed in the bent lugs 36a such that, when the guide roller 34 move along the arcuate guideways 36b, the seedling pushing out rods 32 may be moved upwardly and downwardly substantially in alignment with the seedling taking out position R1.

Figure 5:
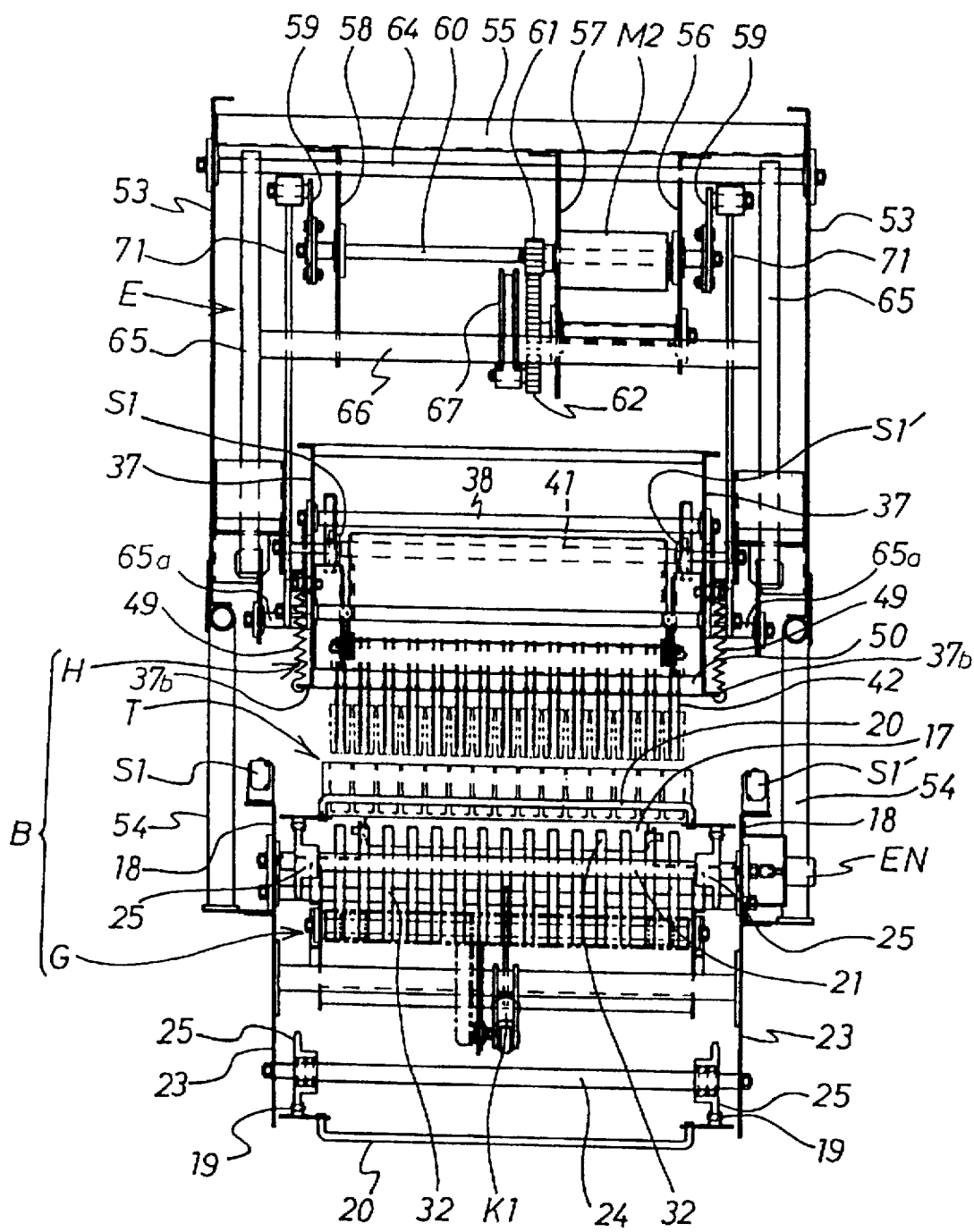
FIG. 5 is a front elevational view of the seedling transportation apparatus shown in FIG. 1.
Figure 6:
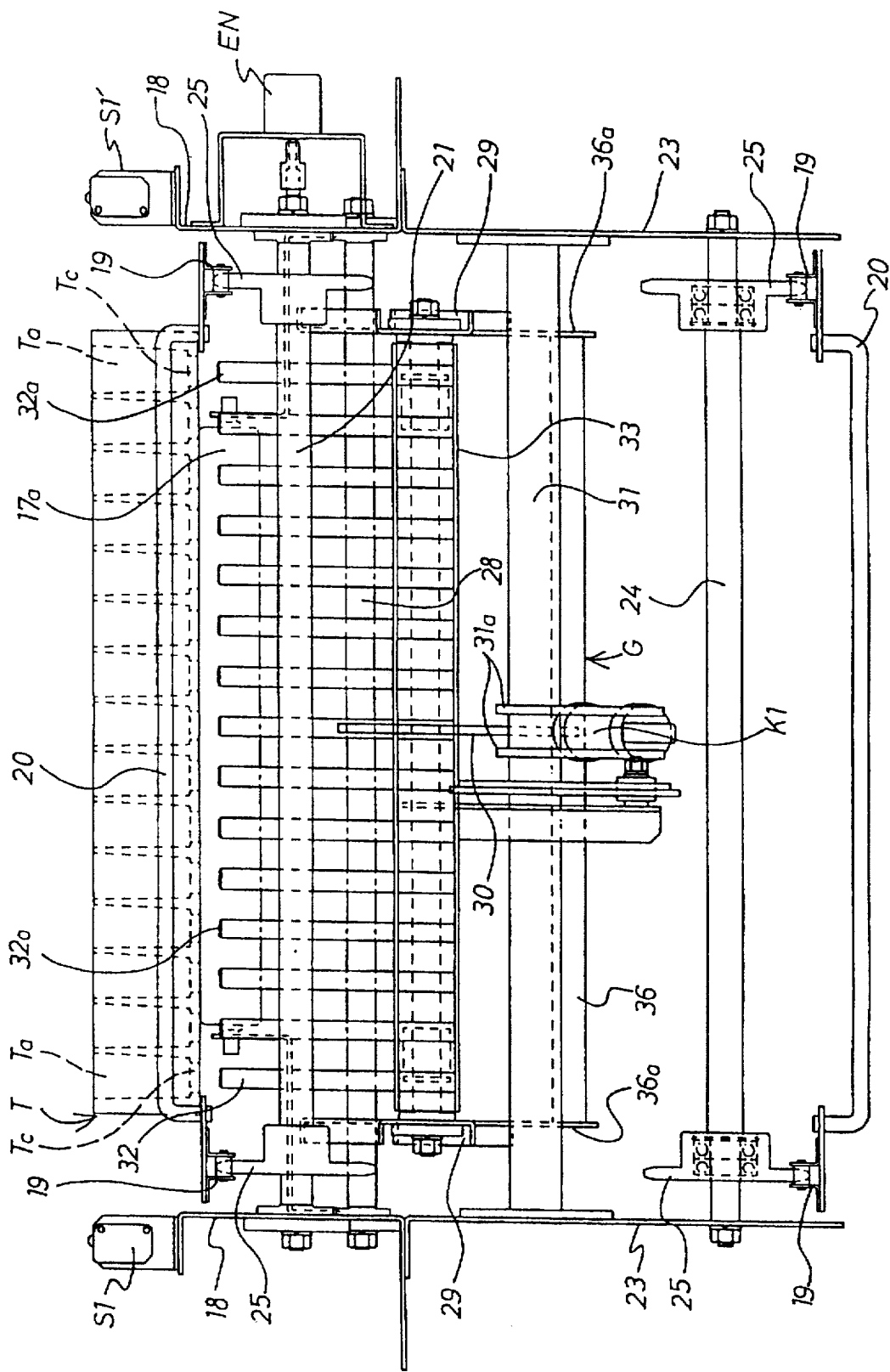
FIG. 6 is an enlarged front elevational view showing details of a portion of the seedling transportation apparatus of FIG. 5 around the seedling taking out position.

Referring to FIGS. 5 and 6, each of the seedling pushing out rods 32 is a round bar member having a thickness with which it can be fitted in the rod insertion hole Tc of a cell Ta of a seedling tray T, and the seedling pushing out rods 32 are disposed in a row in the same pitch α as that of the cells Ta such that they are opposed to the cells Ta which make a row.

If the driving rod K1a of the fluid pressure cylinder K1 is driven to extend, then the pushing up arms 29 are pivoted around the shaft 28 so that the free end portions thereof may move downwardly. On the other hand, if the driving rod K1a is driven to contract, then the pushing up arms 29 are pivoted around the shaft 28 so that the free end portions thereof may move upwardly.

Consequently, the seedling pushing out rods 32 are moved back and forth between a pushing out start position R2 at which seedling contacting end faces 32a thereof are spaced downwardly from the rod insertion holes Tc of the opposing cells Ta and a pushing out end position R3 in which the seedling contacting end faces 32a project upwardly through the upper openings Tb of the opposing cells Ta (FIG. 10).

In this manner, seedlings P in those cells Ta stopping at the seedling taking out position R1 are pushed out upwardly from within the cells Ta when the seedling pushing out rods 32 move to the pushing out end position R3, and then when the seedling pushing out rods 32 further move to the pushing out end position R3, the trailing ends Pb of the seedlings P are moved upwardly away from the upper openings Tb of the cells Ta.

The seedling holding mechanism H is supported by the transferring apparatus E, which will be hereinafter described in detail, such that seedling holding needles 42 for penetration into seedlings P to be pushed out from those cells Ta stopping at the seedling taking out position R1 may be movable back and forth between a seedling penetrating position R4 at which they are located in the proximity of the upper openings Tb of the cells Ta and a seedling releasing position R5 above the seedling carrying out conveyor D at which they transfer the seedlings P to the seedling carrying out conveyor D.

The seedling holding mechanism H particularly when it moves the seedling holding needles 42 to the seedling penetrating position R4 will be described below with reference to FIGS. 10 to 13.

A pair of left and right side plates 37 are supported for upward and downward pivotal motion at lower end portions of pivotal levers 65 of the transferring apparatus E by means of a pair of shafts 65a. A shaft 38 extends horizontally between front portions of the left and right side plates 37, and a pair of needle pulling in levers 40 are supported at base end portions thereof for pivotal motion on the shaft 38. A pair of tension springs 39 (only one is shown in FIGS. 10 and 11) extend between the needle pulling in levers 40 and the left and right side plates 37 (FIGS. 10, 11 and 13).

A guide shaft 41 extends horizontally between end portions of the needle pulling in levers 40, and a needle supporting member 43 having a plurality of downwardly extending seedling holding needles 42 provided thereon is supported for pivotal motion on the guide shaft 41 via a bracket 44. A pair of guide rollers 45 (only one is shown in FIGS. 10 and 11) are mounted for rotation at a pair of bent lugs 44a of the bracket 44 via support pieces 46.

The seedling holding needles 42 are moved upwardly and downwardly while keeping the downwardly extending postures thereof as the needle pulling in levers 40 are pivoted upwardly and downwardly around the shaft 38.

Figure 13:
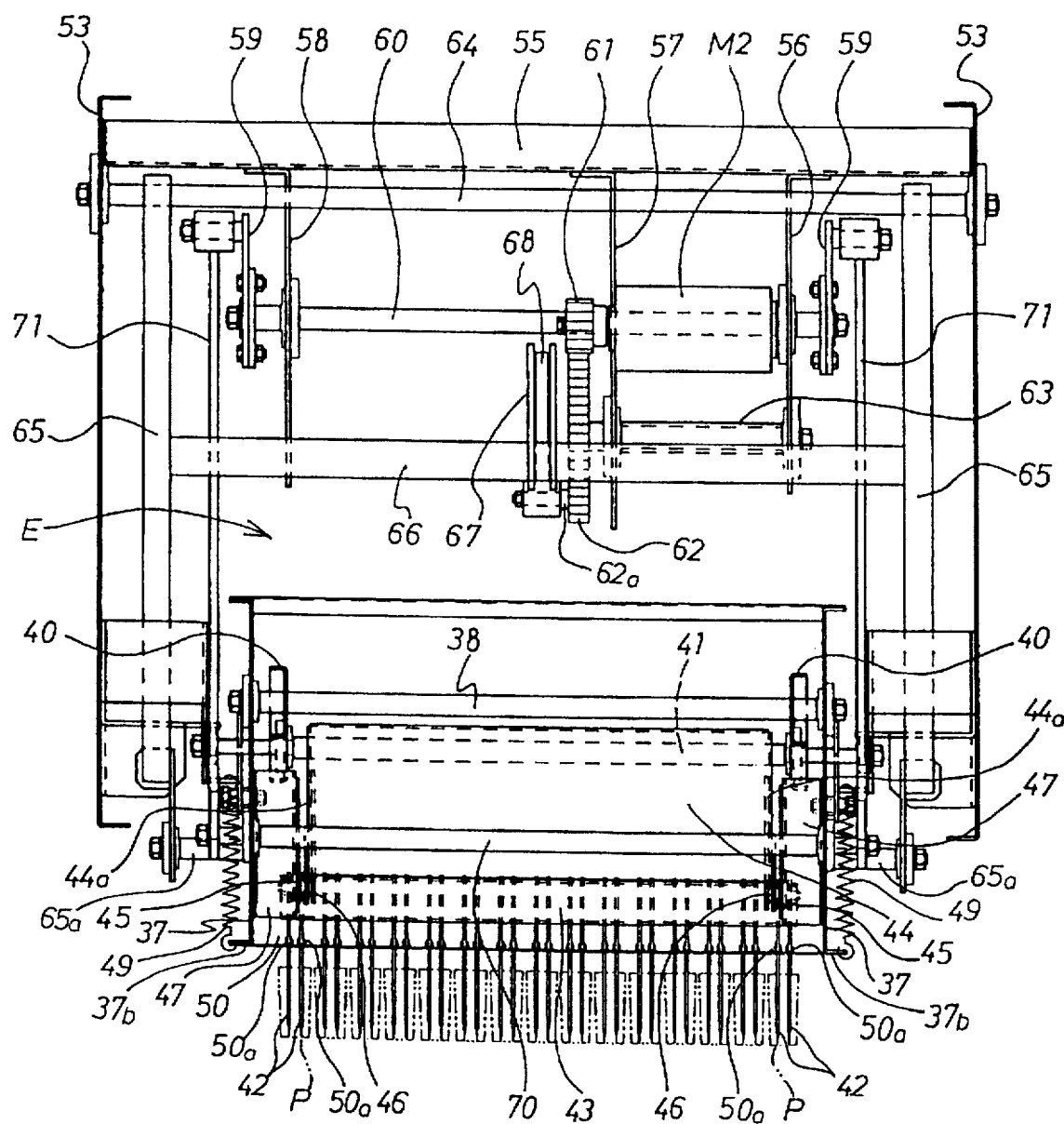
FIG. 13 is a front elevational view of the transferring apparatus and the seedling holding mechanism of FIG. 12.
Figure 14:
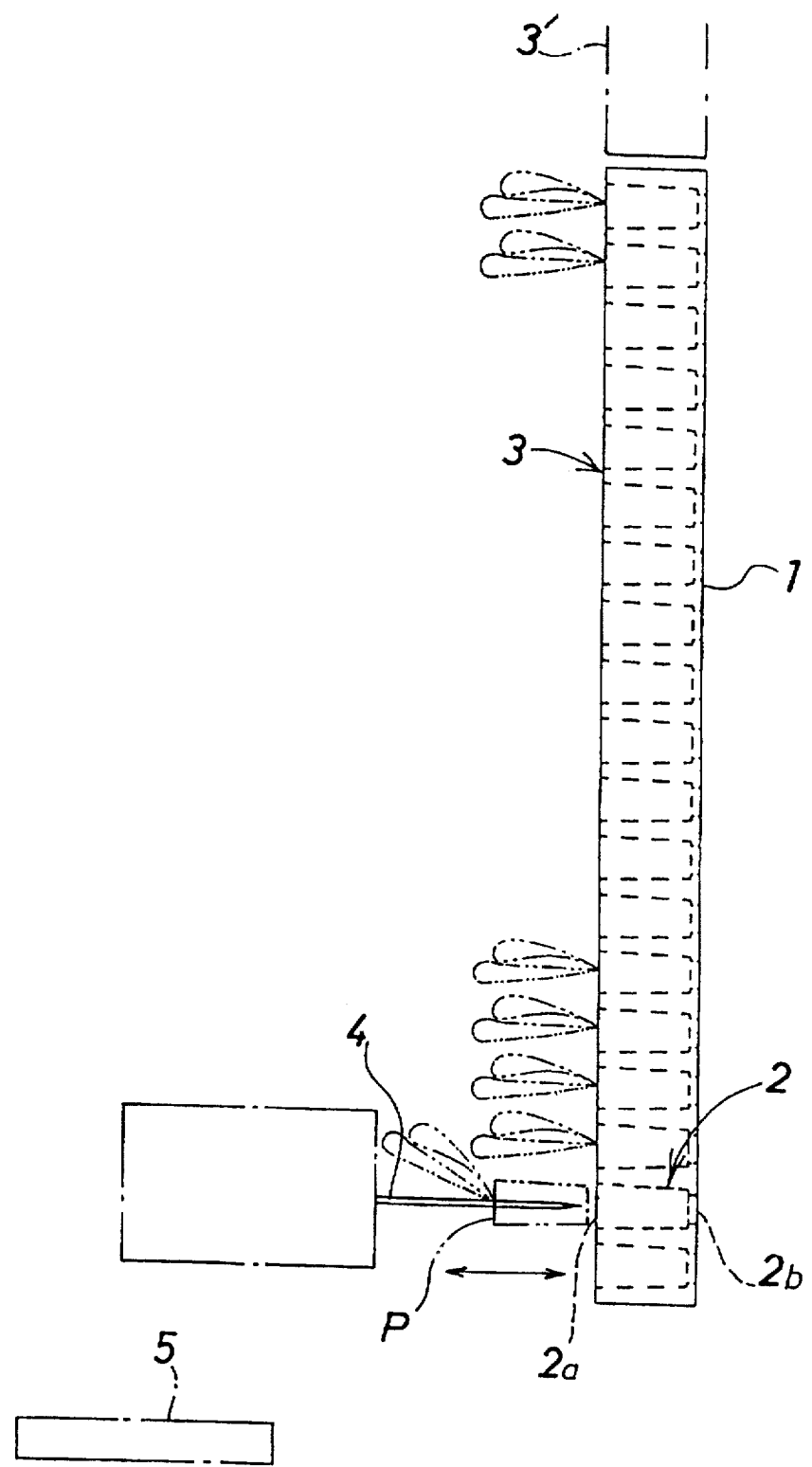
FIG. 14 is a schematic view showing part of a conventional seedling transportation apparatus.

The left and right side plates 37 have arcuate guideways 37a formed therein for guiding the guide shaft 41, and a pair of guide plates 47 in which arcuate guideways 47a for guiding the guide rollers 45 are formed in inner walls of the left and right side plates 37 (FIGS. 10, 11 and 13).

A pair of hooks 48 for arresting the guide shaft 41 moved to a position at the lower ends of the arcuate guideways 37a are mounted for rotation on shafts 48a on outer faces of the left and right side plates 37.

Figure 12:
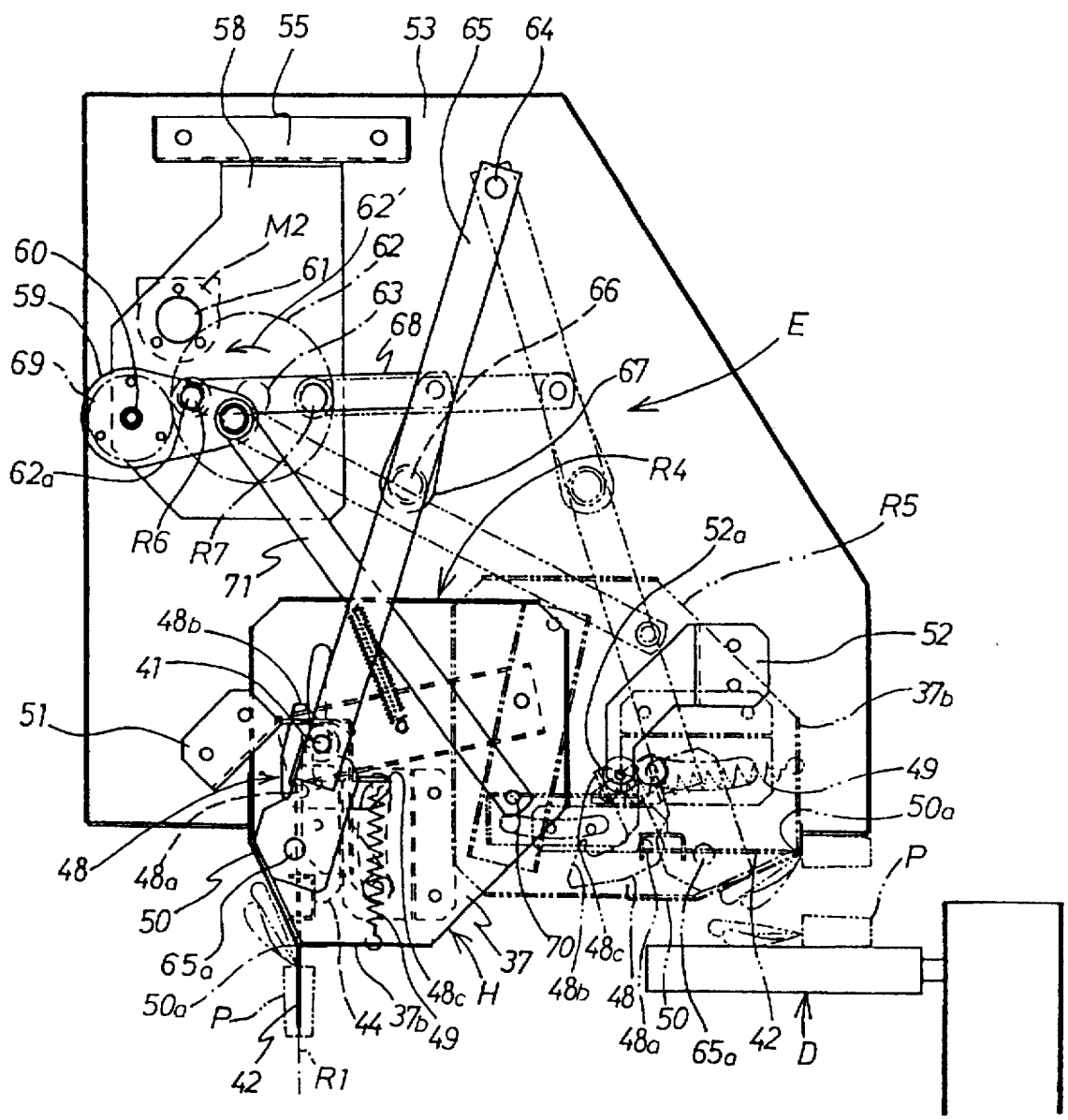
FIG. 12 is an enlarged side elevational view of a transferring apparatus and a seedling holding mechanism of the seedling transportation apparatus of FIG. 5.

Each of the hooks 48 has a substantially L-shape in side elevation and has a guide shaft arresting portion 48b formed at one of a pair of legs thereof for arresting the guide shaft 41 while a spring mounting piece 48c to which an end of a coil spring 49 having the other end attached to a bent lug 37b of a corresponding one of the left and right side plates 37 is to be attached is formed at the other leg of the hook 48 (FIG. 12). Consequently, the hooks 48 are normally biased by the coil springs 49 in a direction in which the guide shaft arresting portions 48b thereof approach the guide shaft 41.

The seedling holding needles 42 have a linear profile and located in pairs at intervals of the pitch a between the cells Ta of a seedling tray T in a row extending along a row of cells. A seedling releasing plate 50 is provided between lower end portions of the left and right side plates 37 and has formed therein needle loosely fitting holes 50a in which the seedling holding needles 42 are individually fitted loosely (FIGS. 10, 11 and 12).

Located on inner faces of a pair of left and right support plates 53 of the transferring apparatus E are a pair of stoppers 51 for moving the guide shaft 41 of the seedling holding mechanism H moved to the seedling penetrating position R4 to the lower ends of the arcuate guideways 37a until the guide shaft 41 is arrested by the hooks 48, and a pair of arrest releasing members 52 having contacting rollers 52a for contacting with the hooks 48 of the seedling holding mechanism H moved to the seedling releasing position R5 to cancel the arrested condition of the guide shaft 41 by the hooks 48.

In the seedling penetrating position R4, the guide shaft 41 is arrested by the hooks 48, and consequently, the seedling holding needles 42 are held at pushed down positions in which the lower ends thereof are positioned in the proximity of the upper openings Tb of opposing cells Ta so that seedlings P which are pushed out from the cells Ta may be penetrated by the lower ends of the guide shaft 41 immediately after they start to be pushed out.

Seedlings P in those cells Ta moved to the seedling taking out position R1 are penetrated and held by the seedling holding needles 42 of the seedling holding mechanism H at the seedling penetrating position R4 immediately after they start to be pushed out by the seedling pushing out rods 32, and as they are thereafter pushed out further by the seedling pushing out rods 32, they are penetrated gradually deeply by the seedling holding needles 42.

Then, when the the seedling pushing out rods 32 are moved to the pushing out end position R3, that is, when the trailing ends Pb of the seedlings P in the pushing out direction are pushed out to locations above the upper openings Tb of the cells Ta, the seedling holding needles 42 penetrate fully from the leading ends to the trailing ends Pb of the seedlings P in the pushing out direction (FIG. 10).

The transferring apparatus E is constructed in the following manner. In particular, the left and right support plates 53 are provided uprightly on a pair of mounting frames 54 which are mounted between an upper end portion of the machine frame 16 and intermediate portions of the left and right base plates 18 such that they extend across the tray space SP (FIGS. 1 to 5).

A connection plate 55 extends horizontally between upper end portions of the left and right support plates 53 and has support legs 56 to 58 extending downwardly from a lower face thereof. A support shaft 60 extends through and is supported for rotation on the support legs 56 to 58, and has a pair of brackets 59 secured at the opposite left and right ends thereof. A motor M2 is secured between the support legs 56 and 57, and a driving gear 62 is held in meshing engagement with a gear secured to a driving shaft of the motor M2. The driving gear 62 is secured to an inner end portion of a rotary shaft 63 which is supported for rotation on and extends horizontally between the support legs 56 and 57 (FIGS. 12 and 13).

A lever supporting shaft 64 extends horizontally between front side upper end portions of the left and right support plates 53, and the pivotal levers 65 having the left and right side plates 37 of the seedling holding mechanism H supported for pivotal motion at lower end portions thereof are supported for pivotal motion at upper ends thereof on the lever supporting shaft 64. Further, a connection member 66 extends horizontally between the pivotal levers 65, and a bracket 67 is provided at an intermediate portion of the connection member 66. A connection rod 68 is mounted for rotation at the opposite ends thereof on the bracket 67 and an eccentric mounting pin 62a provided projectingly and eccentrically on the driving gear 62.

If the eccentric mounting pin 62a of the driving gear 62 is rotated forwardly and reversely between a driving start position R6 and a driving end position R7, then the pivotal levers 65 are rocked so that the seedling holding mechanism H may be moved between the seedling penetrating position R4 and the seedling releasing position R5.

A small gear 69 is secured to a central portion of the support shaft 60 and is held in meshing engagement with the driving gear 62. A pair of support levers 71 are mounted at upper end portions thereof on the brackets 59 provided at the opposite left and right end portions of the support shaft 60, and the left and right side plates 37 of the seedling holding mechanism H are supported for pivotal motion on a shaft 70 extending horizontally between lower end portions of the support levers 71.

When the driving gear 62 rotates in the direction indicated by an arrow mark 62' in FIG. 12, the eccentric mounting pin 62a moves from the driving start position R6 toward the driving end position R7, whereupon the brackets 59 are pivoted upwardly. Thereupon, the left and right side plates 37 of the seedling holding mechanism H are acted upon by a force to pivot them upwardly around the shafts 65a of the pivotal levers 65. Consequently, the seedling holding mechanism H is pivoted upwardly by 90 degrees around the shafts 65a to a posture in which the seedling holding needles 42 extend horizontally, and is moved to the seedling releasing position R5 while keeping the posture.

If the motor M2 rotates reversely, then the seedling holding mechanism H moves back from the seedling releasing position R5 to seedling penetrating position R4 following the locus of movement described above reversely.

The seedling carrying out conveyor D is supported above the tray space SP formed adjacent the front ends 18a of the left and right base plates 18, and a vertical conveyor 72 for transporting a seedling P toward the corresponding seedling planting wheel 14 is provided adjacent the last end of the seedling carrying out conveyor D in the carrying out direction.

Subsequently, a series of seedling supplying operations by the seedling transportation apparatus A having the construction described above will be described.

Before a taking out operation for seedlings P is started, the seedling holding mechanism H is moved to the seedling penetrating position R4.

If seedling trays T are placed on the tray transportation apparatus C and a moving operation of them is started, then the seedling trays T are transported horizontally toward the seedling taking out apparatus B and a preceding one of them is stopped when the first cell row T1 thereof comes to the seedling taking out position R1.

Then, a pushing out operation for the seedlings P of the first cell row T1 of the seedling tray T is started by the seedling pushing out rods 32 of the seedling pushing out mechanism G so that the seedlings P are individually penetrated by the corresponding seedling holding needles 42 until they are held by the seedling holding needles 42.

After completion of the penetration operation into the seedlings P, the seedling pushing out rods 32 are moved back to the pushing out start position R2, and the seedling holding mechanism H is moved from the seedling penetrating position R4 toward the seedling releasing position R5 while it is pivoted upwardly by 90 degrees around the shafts 65a.

When the seedling holding mechanism H comes to the seedling releasing position R5, the hooks 48 are brought into contact with the contacting rollers 52a of the arrest releasing members 52 to cancel the arrested condition of the guide shaft 41 by the hooks 48, and consequently, the seedling holding needles 42 are pulled in rapidly between the left and right side plates 37.

By the pulling in operation, the seedlings P which have been penetrated by the seedling holding needles 42 are pulled out and released by the seedling releasing plate 50 and placed onto the seedling carrying out conveyor D therebelow. The seedlings P placed on the seedling carrying out conveyor D are thereafter transferred to the vertical conveyor 72 and transported toward the seedling planting wheel 14 by the vertical conveyor 72.

When the seedlings P are released, the seedling holding mechanism H is moved back toward the seedling penetrating position R4, and the seedling pushing out rods 32 of the seedling pushing out mechanism G are moved back to the pushing out start position R2. Then, also the tray transportation apparatus C is driven to move the seedling tray T so that the next cell row may come to the seedling taking out position R1. Consequently, the seedling tray T is moved gradually into the tray space SP by the driving of the tray transportation apparatus C.

After taking out of the seedlings P accommodated in the seedling tray T is completed in this manner, the entire seedling tray T is moved to the tray space SP, in which it thereafter stays for a certain period of time.

Then, when seedlings P accommodated in a following seedling tray T are started to be taken out from the seedling tray T in a similar manner to that from the preceding seedling tray T, the leading end of the following seedling tray T is brought into contact with and urges the rear end of the preceding seedling tray T to move the preceding seedling tray T.

It is to be noted that the present invention is not limited to the specific embodiment described above, but can be embodied in various forms within the spirit and scope of the invention.

For example, while, in the embodiment described above, the tray space is constructed such that a single seedling tray T may temporarily stay therein, it may be constructed otherwise such that a seedling tray moved later may be placed on another seedling tray moved earlier so that several seedling trays may temporarily stay in a piled up condition in the tray space. With the alternative construction, the time until seedling trays staying in the tray space must be removed can be set comparatively long, and the seedling tray exchanging operation can be further moderated.

Or, the tray space for allowing a seedling tray to temporarily stay therein need not be formed, but upon transferring operation of seedlings to the seedling carrying out conveyor, a seedling tray may be moved successively to a location below the seedling carrying out conveyor.

Having now fully described the invention, it will be apparent to one of ordinary skill in the art that many changes and modifications can be made thereto without departing from the spirit and scope of the invention as set forth herein.

What is claimed is:

1. A seedling transportation apparatus for a transplantation machine, comprising:

a seedling taking out apparatus for taking out a seedling upwardly from a seedling tray having seeding accommodating cells in which seedlings are accommodated;

a tray transportation apparatus having a horizontal transport path for transporting the seedling tray toward said seedling taking out apparatus;

a seedling carrying out conveyor disposed at a location higher than said horizontal transport path of said tray transportation apparatus; and a transferring apparatus for transferring the seedling taken out by said seedling taking out apparatus onto said seedling carrying out conveyor.

2. A seedling transportation apparatus for a transplantation machine as claimed in claim 1, wherein said seedling taking out apparatus includes a seedling pushing out mechanism for pushing out a seedling upwardly from the seedling tray and a seedling holding mechanism for holding the seedling pushed out by said seedling pushing out mechanism.

3. A seedling transportation apparatus for a transplantation machine as claimed in claim 2, wherein said transferring apparatus moves said seedling holding mechanism back and forth between a seedling penetrating position at which said seedling holding mechanism receives a seedling in a cell of the seedling tray and a seedling releasing position at which said seedling holding mechanism releases the received seedling toward said seedling carrying out conveyor.

4. A seedling transportation apparatus for a transplantation machine as claimed in claim 1, 2 or 3, further comprising means defining a tray space formed on the downstream side of said tray transportation apparatus below said seedling carrying out conveyor.

* * * * *